(12) United States Patent
Basgall

(10) Patent No.: US 7,104,170 B1
(45) Date of Patent: Sep. 12, 2006

(54) AIR RELEASE STOCK STOP

(76) Inventor: Robert M. Basgall, 1939 Kindig Rd. S, Alger, MI (US) 48610

( * ) Notice: Subject to any disclaimer, the term of this patent is extended or adjusted under 35 U.S.C. 154(b) by 0 days.

(21) Appl. No.: 11/247,745

(22) Filed: Oct. 10, 2005

(51) Int. Cl.
B23B 3/36 (2006.01)

(52) U.S. Cl. .................................. 82/153; 82/152

(58) Field of Classification Search ............... 82/152, 82/153, 126, 127
See application file for complete search history.

(56) References Cited

U.S. PATENT DOCUMENTS

| | | | | |
|---|---|---|---|---|
| 3,431,768 | A * | 3/1969 | Kull et al. | 72/419 |
| 3,636,792 | A | 1/1972 | Vigh | 74/461 |
| 3,720,123 | A | 3/1973 | Eichenhofer | 82/34 |
| 3,722,334 | A | 3/1973 | Schubert | 82/34 |
| 3,747,444 | A | 7/1973 | Schubert | 82/28 |
| 3,760,661 | A | 9/1973 | Eichenhofer | 82/2.7 |
| 3,780,924 | A | 12/1973 | Eichenhofer | 226/155 |
| 3,835,683 | A | 9/1974 | Bradick | 72/36 |
| 3,917,143 | A | 11/1975 | Yourkievitz | 226/141 |
| 5,033,339 | A * | 7/1991 | Parker | 82/153 |
| 5,044,055 | A | 9/1991 | Howarth et al. | 29/49 |
| 5,058,467 | A * | 10/1991 | Hoff et al. | 279/156 |
| 5,105,925 | A | 4/1992 | Tremaglio et al. | 192/11 |
| 5,207,135 | A | 5/1993 | Baguder et al. | 82/129 |
| 5,642,650 | A * | 7/1997 | Roote et al. | 82/126 |
| 5,676,031 | A | 10/1997 | Manning | 82/153 |
| 5,785,324 | A * | 7/1998 | Williams et al. | 279/2.03 |
| 5,967,008 | A | 10/1999 | Daniels | 82/153 |
| 6,050,160 | A | 4/2000 | Newell et al. | 82/112 |
| 6,389,939 | B1 | 5/2002 | Babuder et al. | 82/129 |
| 6,421,895 | B1 | 7/2002 | Muscarella et al. | 29/38 |
| 2003/0015483 | A1 | 1/2003 | Hwan et al. | 210/800 |

OTHER PUBLICATIONS

National Acme, Air Operated Stock Stops, Champion Screw Machine Eng., Inc., Publication Date Unknown, 2 Pgs.

* cited by examiner

Primary Examiner—Willmon Fridie, Jr.

(57) ABSTRACT

An air release stock stop for detecting the end of a bar stock during a machining process on a turning machine. The air release stock stop includes a pivot member hingedly connected to a base member by a shaft, an activation member adjustably connected through the pivot member and a valve unit activated by the pivot member within the base member. The base member fastens to the body of a turning machine such that the connected pivot member and activation member align with the spindle(s) on the turning machine. Preferably a bar stock end fixed within the spindle(s) comes in contact with the activation member as the bar stock is fed out to be machined. The force applied by the bar stock as it contacts the activation member causes the pivot member to rotate about the shaft, activating the valve unit to indicate proper feed for the machining process.

16 Claims, 11 Drawing Sheets

AIR RELEASE STOCK STOP

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to stock stops and more specifically it relates to an air release stock stop for detecting the end of a bar stock during a machining process on a turning machine.

2. Description of the Related Art

Any discussion of the prior art throughout the specification should in no way be considered as an admission that such prior art is widely known or forms part of common general knowledge in the field.

Stock stops have been in use for years. Typically, stock stops utilize a mechanism that activates a switch device after an engaging member on the mechanism comes in contact with the bar stock being machined. The mechanism can electrically, pneumatically or hydraulically control the stopping action of the turning machine by halting the bar stock feeding function of the machine. Unfortunately, stock stops currently used today are operated with mechanisms utilizing many parts that cannot withstand the repetitive operations performed and are difficult to repair when failure does occur.

While these devices may be suitable for the particular purpose to which they address, they are not as suitable for detecting the end of a bar stock during a machining process on a turning machine. Current stock stops are not able to withstand the repetitive machining operations performed by the lathes or turning machines.

In these respects, the air release stock stop according to the present invention substantially departs from the conventional concepts and designs of the prior art, and in so doing provides an apparatus primarily developed for the purpose of detecting the end of a bar stock during a machining process on a turning machine.

BRIEF SUMMARY OF THE INVENTION

In view of the foregoing disadvantages inherent in the known types of stock stops now present in the prior art, the present invention provides a new air release stock stop construction wherein the same can be utilized for detecting the end of a bar stock during a machining process on a turning machine.

The general purpose of the present invention, which will be described subsequently in greater detail, is to provide a new air release stock stop that has many of the advantages of the stock stops mentioned heretofore and many novel features that result in a new air release stock stop which is not anticipated, rendered obvious, suggested, or even implied by any of the prior art stock stops, either alone or in any combination thereof.

To attain this, the present invention generally comprises a pivot member hingedly connected to a base member by a shaft, an activation member adjustably connected through the pivot member and a valve unit activated by the pivot member within the base member. The base member fastens to the body of a turning machine such that the connected pivot member and activation member align with the spindle (s) on the turning machine. Preferably a bar stock end fixed within the spindle(s) comes in contact with the activation member as the bar stock is fed out to be machined. The force applied by the bar stock as it contacts the activation member causes the pivot member to rotate about the shaft, activating the valve unit to indicate proper feed for the machining process.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an air release stock stop that will overcome the shortcomings of the prior art devices.

A second object is to provide an air release stock stop for detecting the end of a bar stock during a machining process on a turning machine.

Another object is to provide an air release stock stop that is durable.

An additional object is to provide an air release stock stop that utilizes a ball valve for actuation.

A further object is to provide an air release stock stop that uses few moving parts.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 8*b* illustrate an air release stock stop 10, which comprises a pivot member 30 hingedly connected to a base member 20 by a shaft 60, an activation member 50 adjustably connected through the pivot member 30 and a valve unit 40 activated by the pivot member 30 within the base member 20. The base member 20 fastens to the body of a turning machine such that the connected pivot member 30 and activation member 50 align with the spindle(s) 19 on the turning machine. Preferably a bar stock 18 end fixed within the spindle(s) 19 comes in contact with the activation member 50 as the bar stock 18 is fed out to be machined. The force applied by the bar stock 18 as it contacts the activation member 50 causes the pivot member 30 to rotate about the shaft 60, activating the valve unit 40 to indicate proper feed for the machining process.

B. Base Member

The base member 20 is preferably made of a rigid material that will not distort when machined or fasteners are used to affix it to a machine. The base member 20 is preferably made of a material which will withstand contact with machining chemicals or solutions and exposure to moisture and humidity such that it will not rust or corrode. The base member 20 may additionally be coated with a finishing material which must withstand contact with machining chemicals or solutions and exposure to moisture and humidity. The base member 20 is preferably machined and hardened from a metal (e.g. 4140 steel) however, it can be appreciated that other methods of manufacturing (e.g. cast) and/or steel compositions or metals (e.g. titanium) could be utilized.

Figure 1:
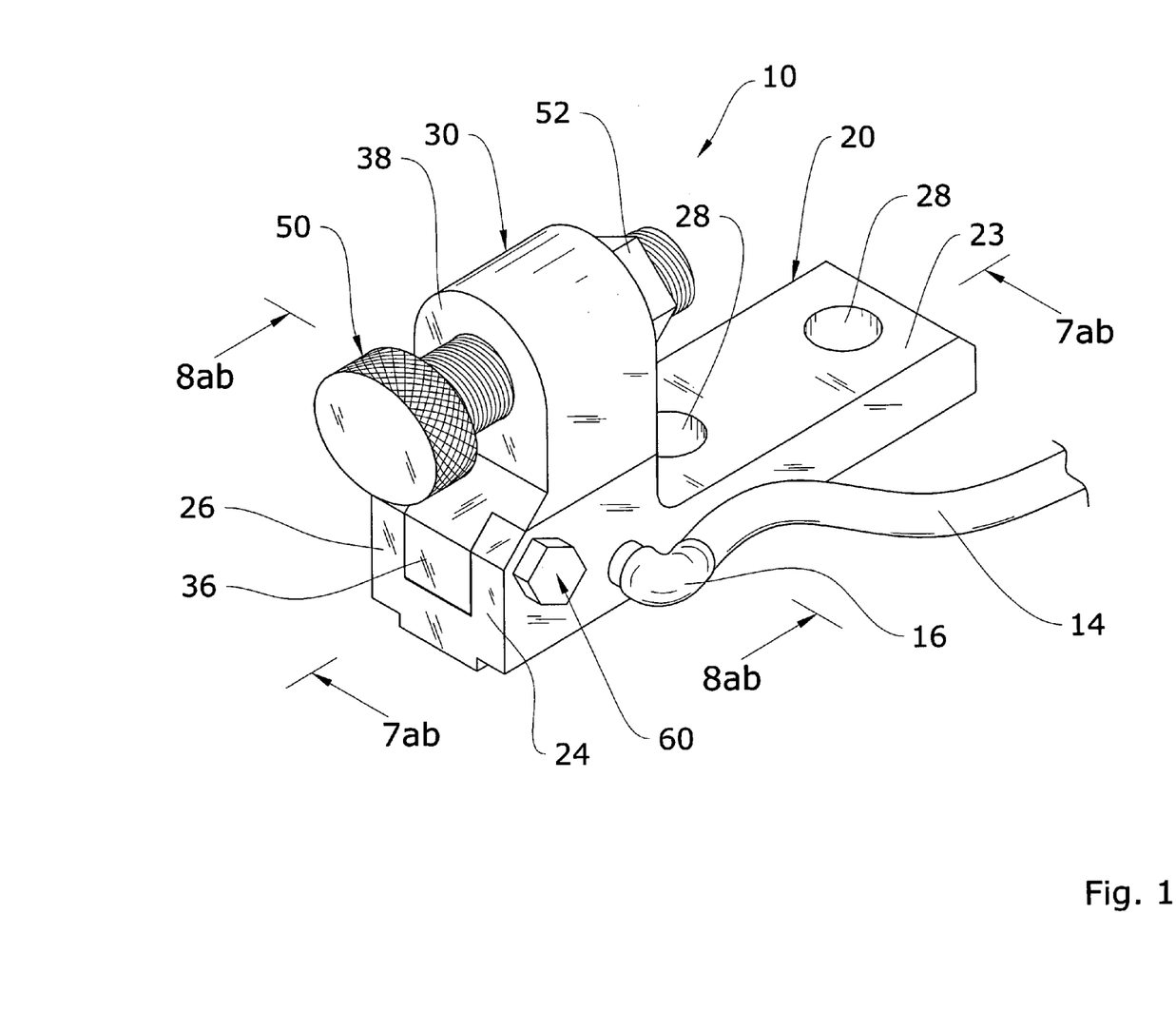
FIG. 1 is an upper perspective view of the present invention.
Figure 2:
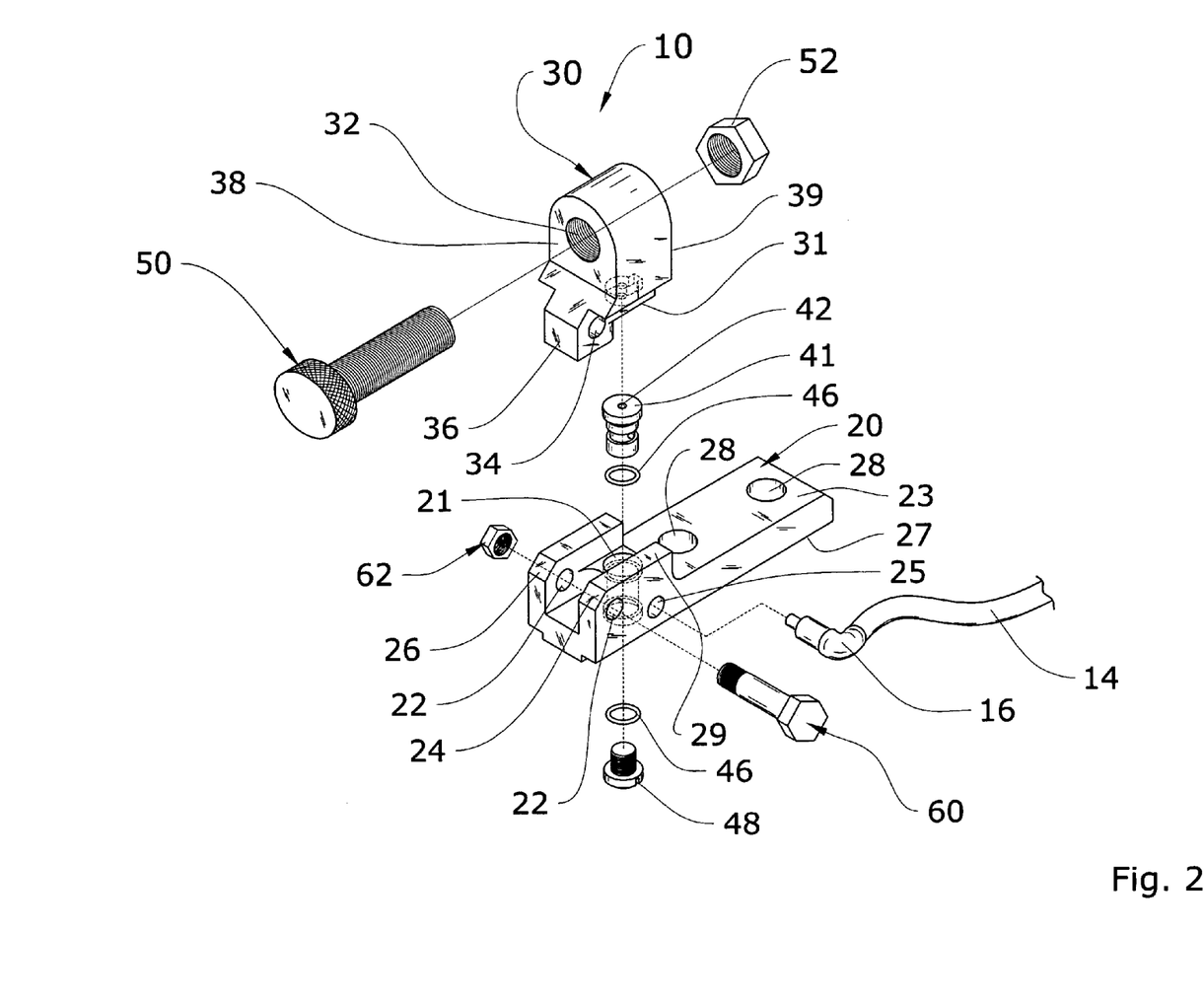
FIG. 2 is an exploded upper perspective view of the present invention.
Figure 4:
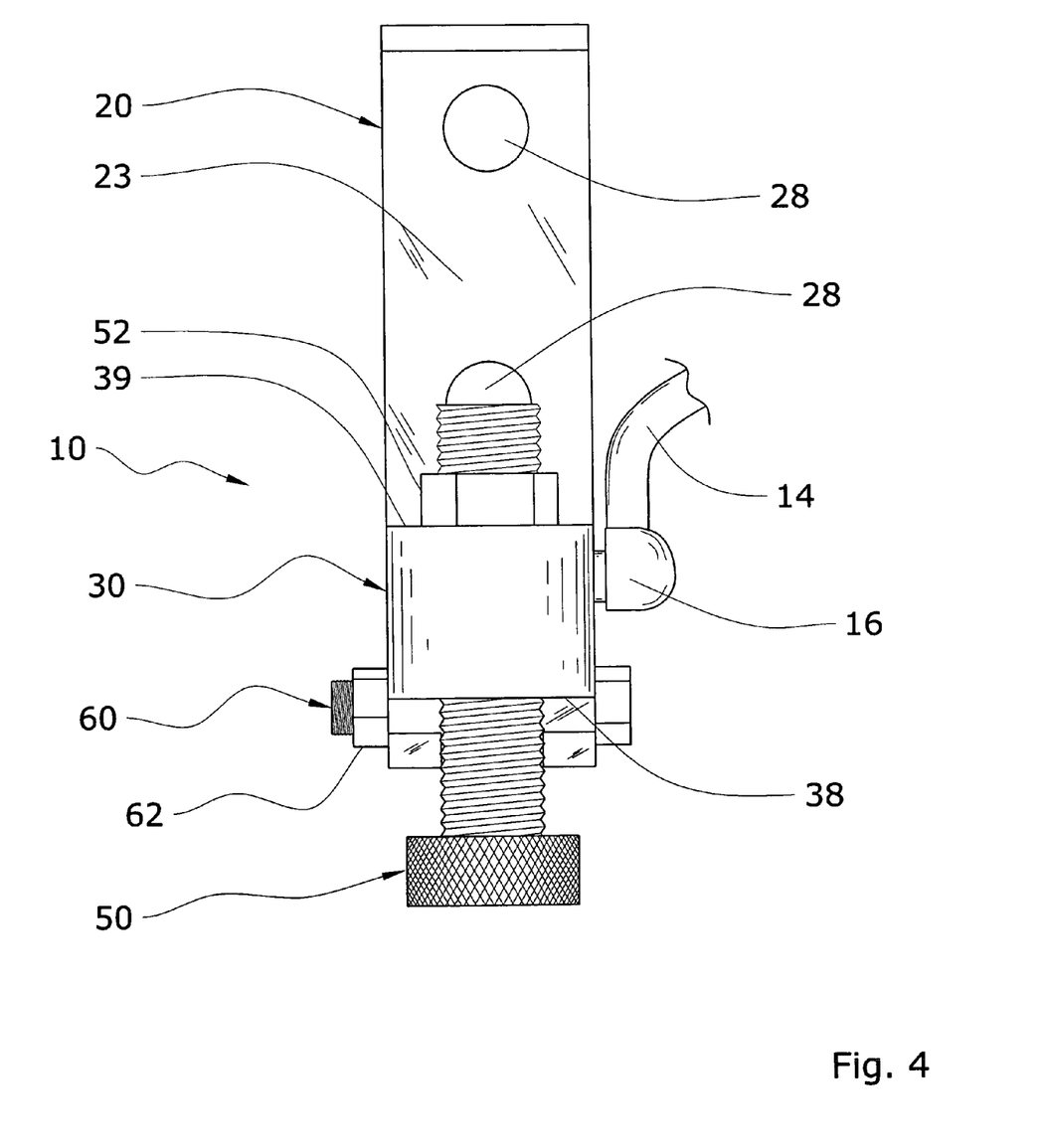
FIG. 4 is a top view of the present invention.
Figure 5:
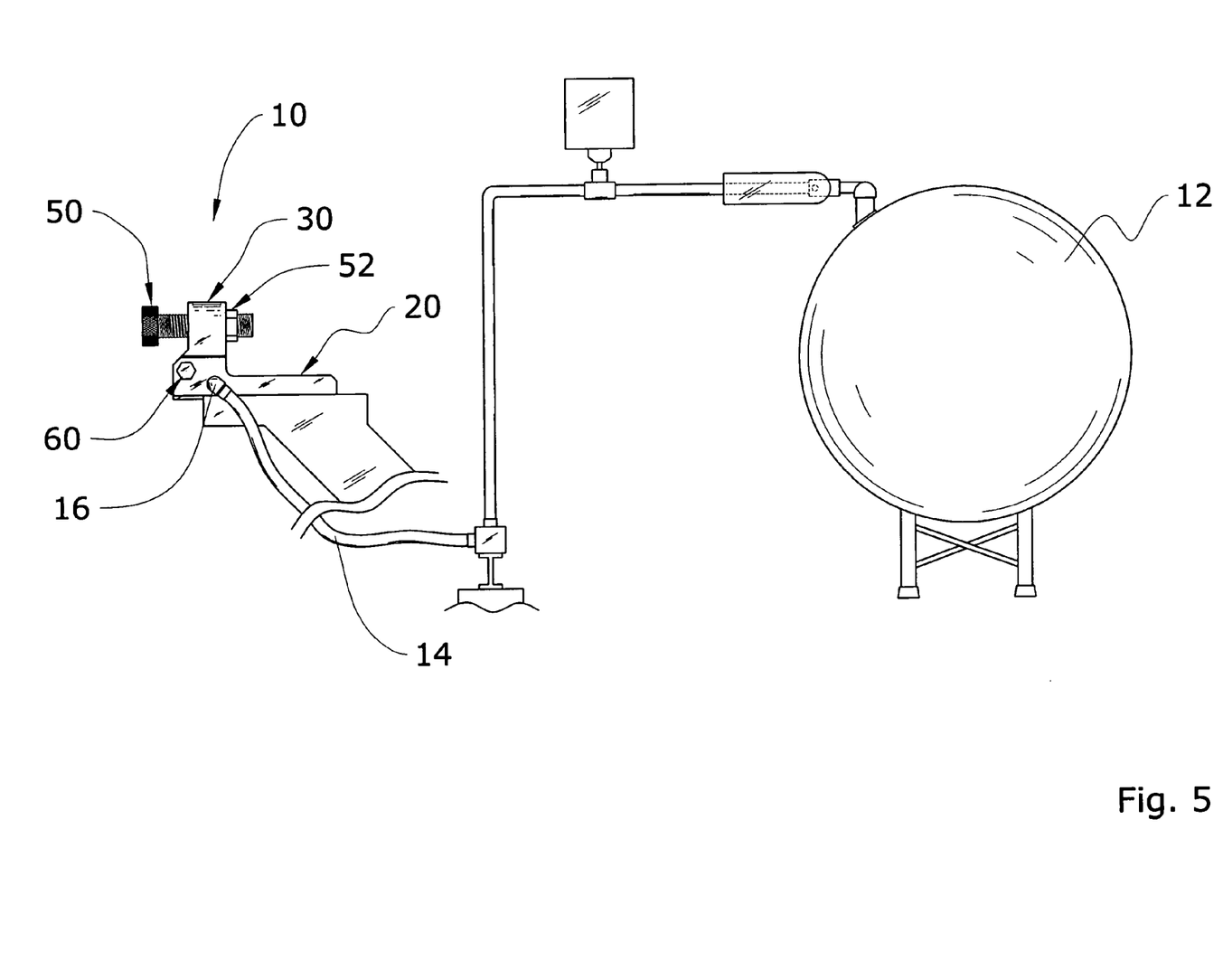
FIG. 5 is a side view of the present invention and pneumatic system.

As shown in FIGS. 1 and 2, the base member 20 is preferably a substantially rectangular shaped structure extending from a lower base surface 27 to an upper base surface 23 further including a first extension 24 and second extension 26 projecting upwardly substantially perpendicular from the upper base surface 23 at one end of the base member 20. As best shown in FIGS. 1, 2 and 4, located substantially near the center of the base member 20 and at the opposing end from the extensions 24, 26 are mounting aperture 28 extending from the lower base surface 27 to the upper surface 23. The mounting apertures 28 are sized to accept fasteners extending through in order to mount the air release stock stop 10 to the turning machine structure or bracket.

As illustrated in FIGS. 2, 3, 8*a* and 8*b*, the first extension 24 and second extension 26 project upwardly from the upper surface 23 of the base member 20 to an extension surface 29 creating a U-shaped cross section at one end of the base member 20. The extension surface 29 extends substantially parallel to the upper base surface 23. The extensions 24, 26 are spaced apart to allow for the insertion of a lower extension 36 on a pivot member 30 to mount within the inner surfaces of each extension 24, 26.

Figure 7A:
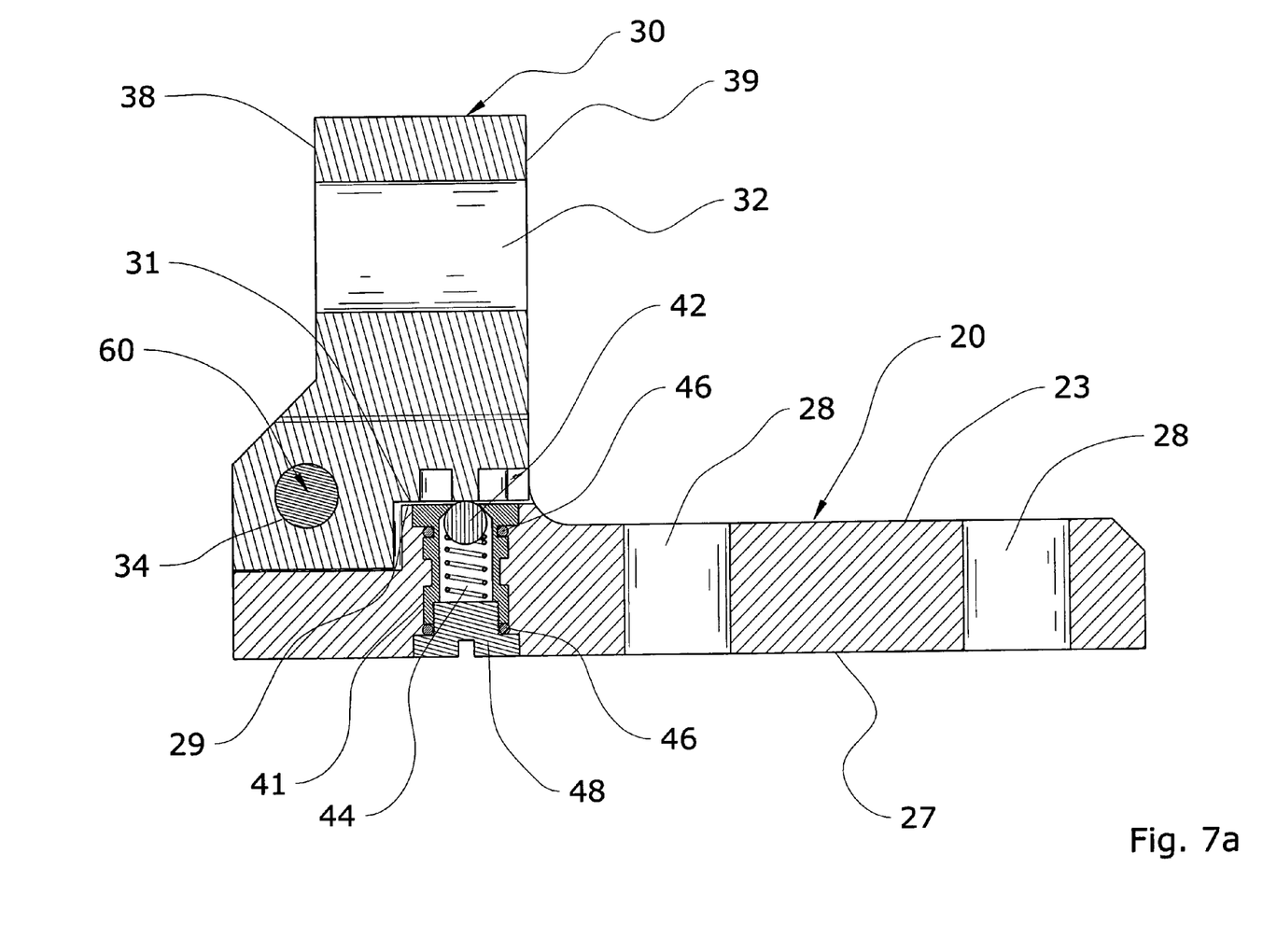
FIG. 7*a* is a cross sectional side view of the present invention.
Figure 8A:
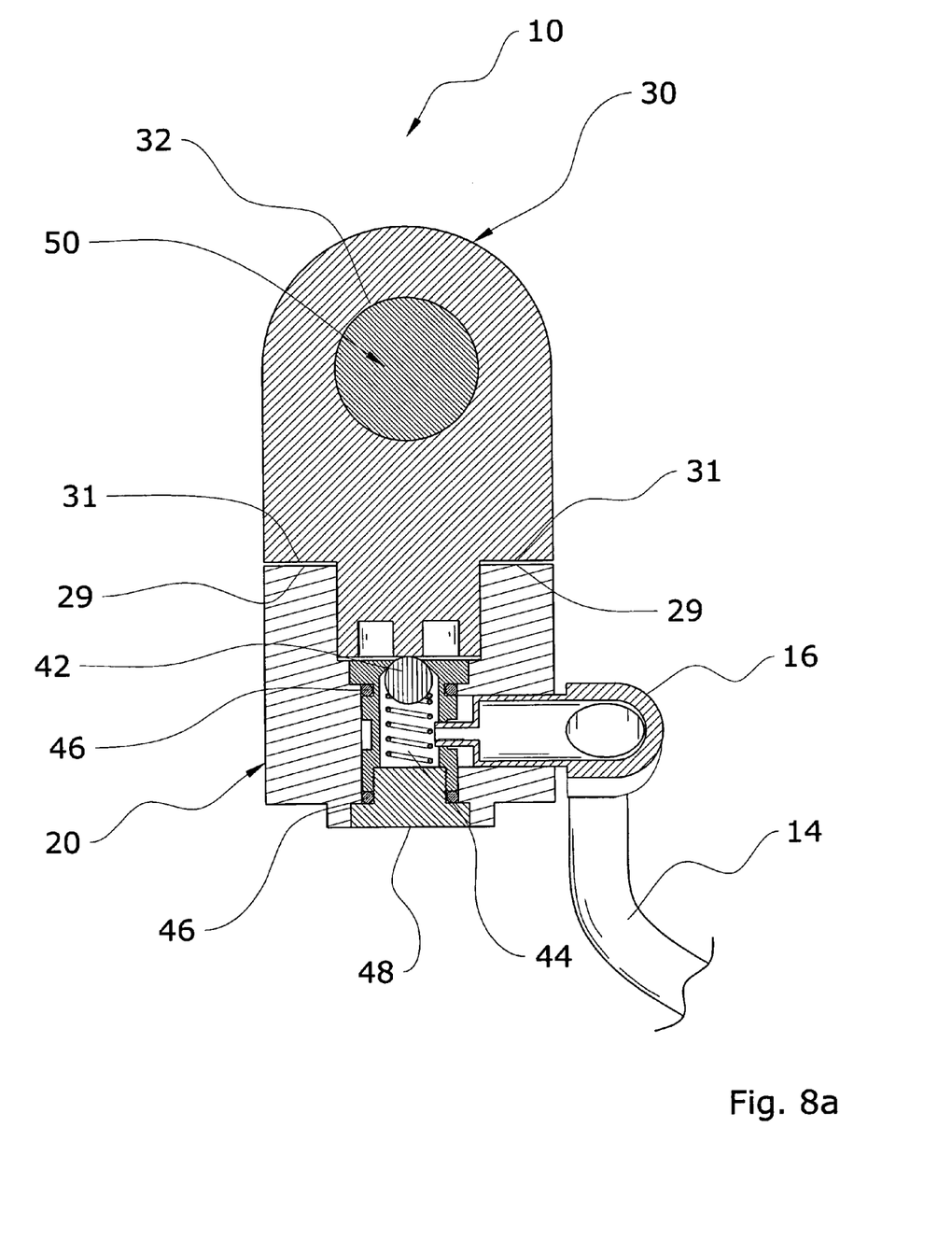
FIG. 8*a* is a cross sectional front view of the present invention.

Located within each extension 24, 26 is a first pivot aperture 22. As best shown in FIG. 2, the first pivot apertures 22 extend substantially perpendicular through each extension 24, 26 such that the center line passing through each first pivot aperture 22 aligns with the other. The first pivot apertures 22 are sized for the insertion of a shaft 60 used to allow for rotation of the pivot member 30. The first pivot apertures 22 are positioned such that when the pivot member 30 is assembled with the shaft 60, a lower surface 31 of the lower extension 36 on the pivot member 30 is raised a distance slightly above the upper base surface 23 of the base member 20. This distance is best illustrated in FIGS. 7*a* and 8*a*.

Figure 7B:
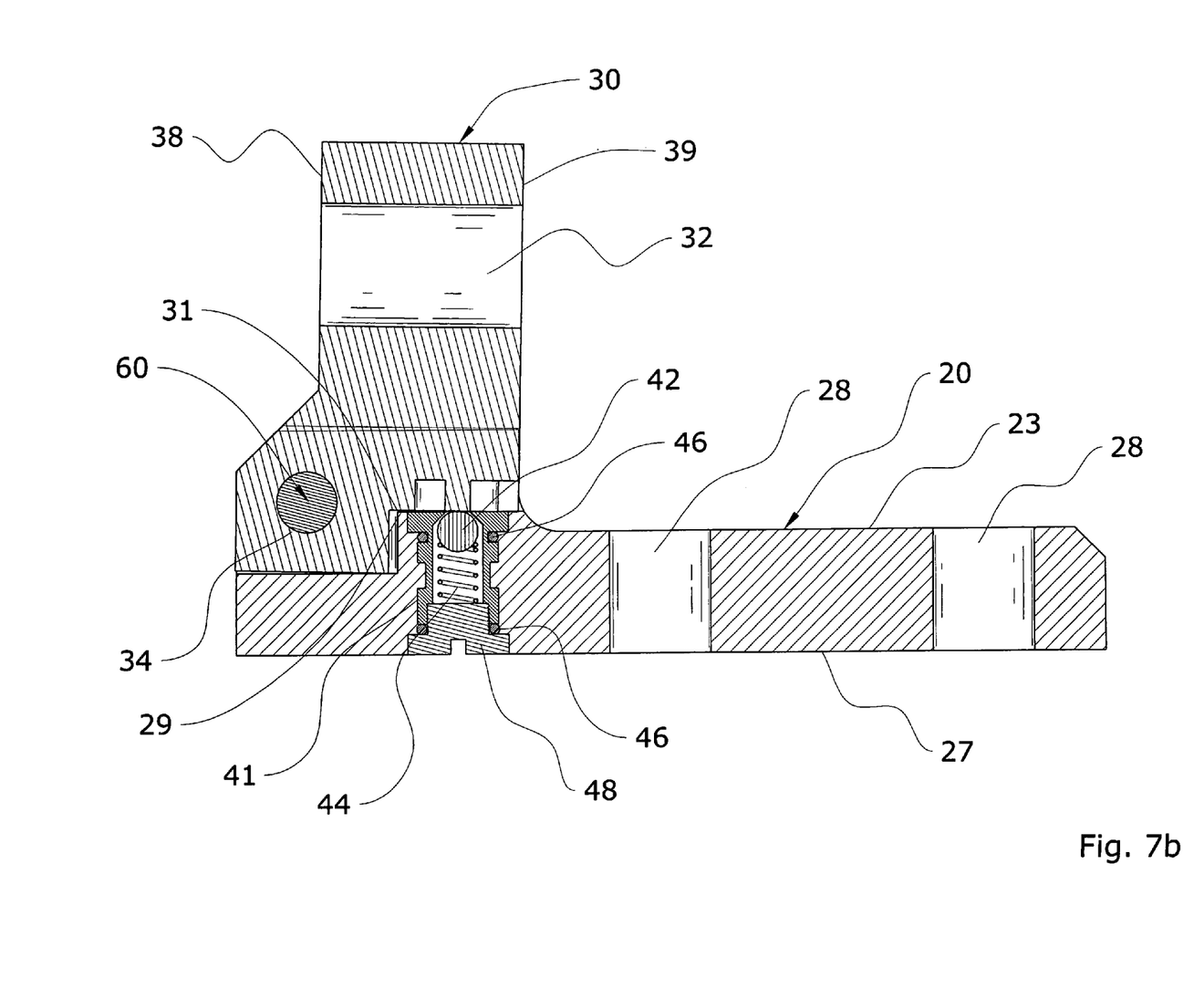
FIG. 7*b* is a cross sectional side view of the present invention when activated.

As best shown in FIG. 2, a valve aperture 21 extends through the base member 20, substantially perpendicular to the lower base surface 27. The valve aperture 21 is machined to allow for the insertion and retention of a valve unit 40 to be discussed more later on. The valve aperture 21 is positioned across the width of the base member 20 substantially an equal distance from each inside surface of the extensions 24, 26. The valve aperture 21 is located along the length of the base member 20 a lateral distance from the first pivot aperture 22 allowing the pivot member 30 to rotate and align with the valve aperture 21 to activate the valve unit 40. The distance and alignment of the valve aperture 21 are best shown in FIGS. 7*a* and 7*b*.

Figure 8B:
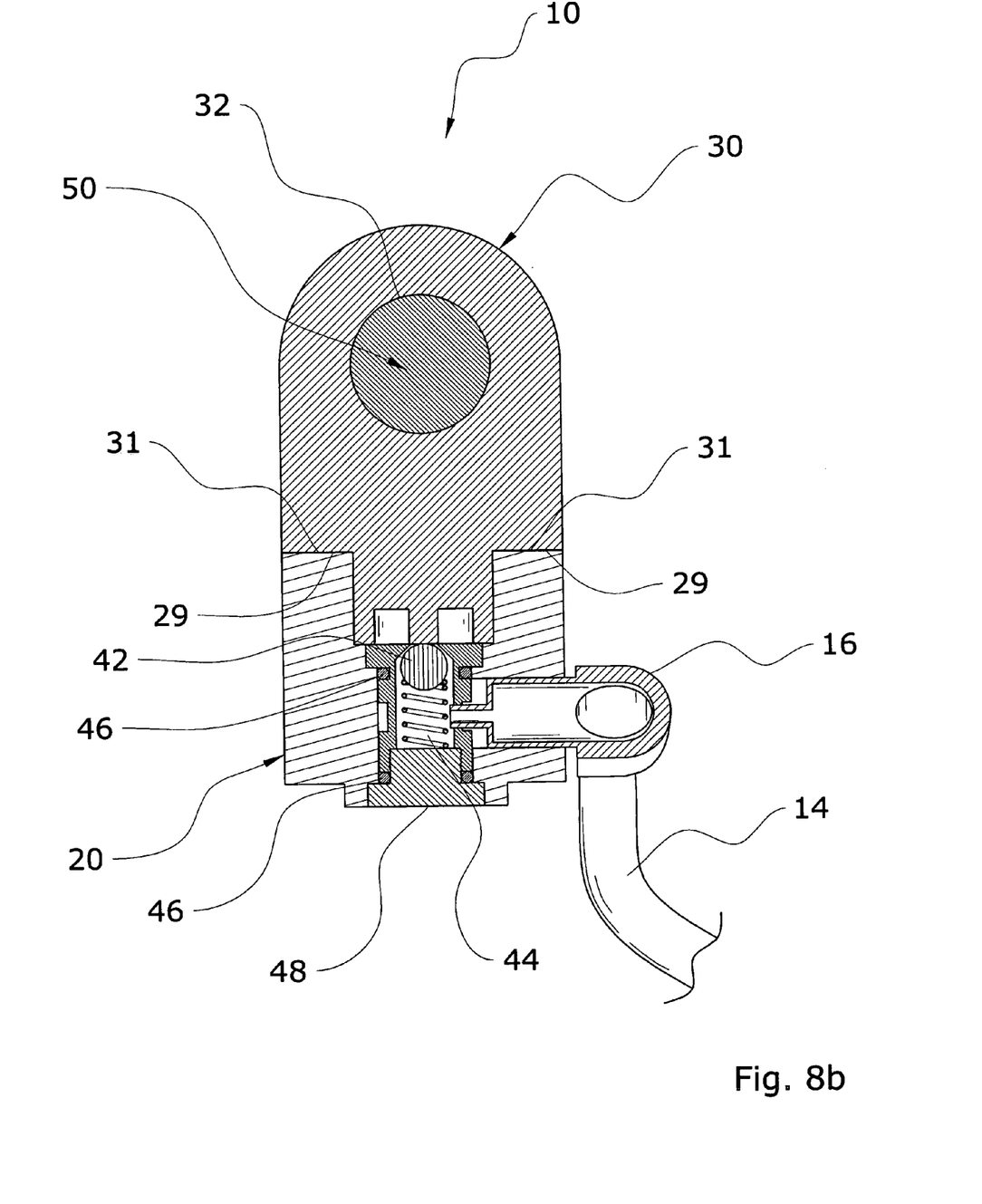
FIG. 8*b* is a cross sectional front view of the present invention when activated.

Further located in the base member 20 is an inlet aperture 25. As best shown in FIGS. 2, 8*a* and 8*b*, the inlet aperture 25 is positioned along the length of the base member 20 in alignment with the valve aperture 21 and extends from one side of the base member 20 into the valve aperture 21. The inlet aperture 25 is sized and/or machined (e.g. threaded) to allow for the insertion of a connector 16 utilized for connecting to an air line 14.

C. Pivot Member

The pivot member 30 is preferably made of a rigid material that will not distort when machined or fasteners are used to affix components within. The pivot member 30 is preferably made of a material which will withstand contact with machining chemicals or solutions and exposure to moisture and humidity such that it will not rust or corrode. The pivot member 30 may additionally be coated with a finishing material which must withstand contact with machining chemicals or solutions and exposure to moisture and humidity. The pivot member 30 is preferably machined and hardened from a metal (e.g. 4140 steel) however, it can be appreciated that other methods of manufacturing (e.g. cast) and/or steel compositions or metals (e.g. titanium) could be utilized.

Figure 3:
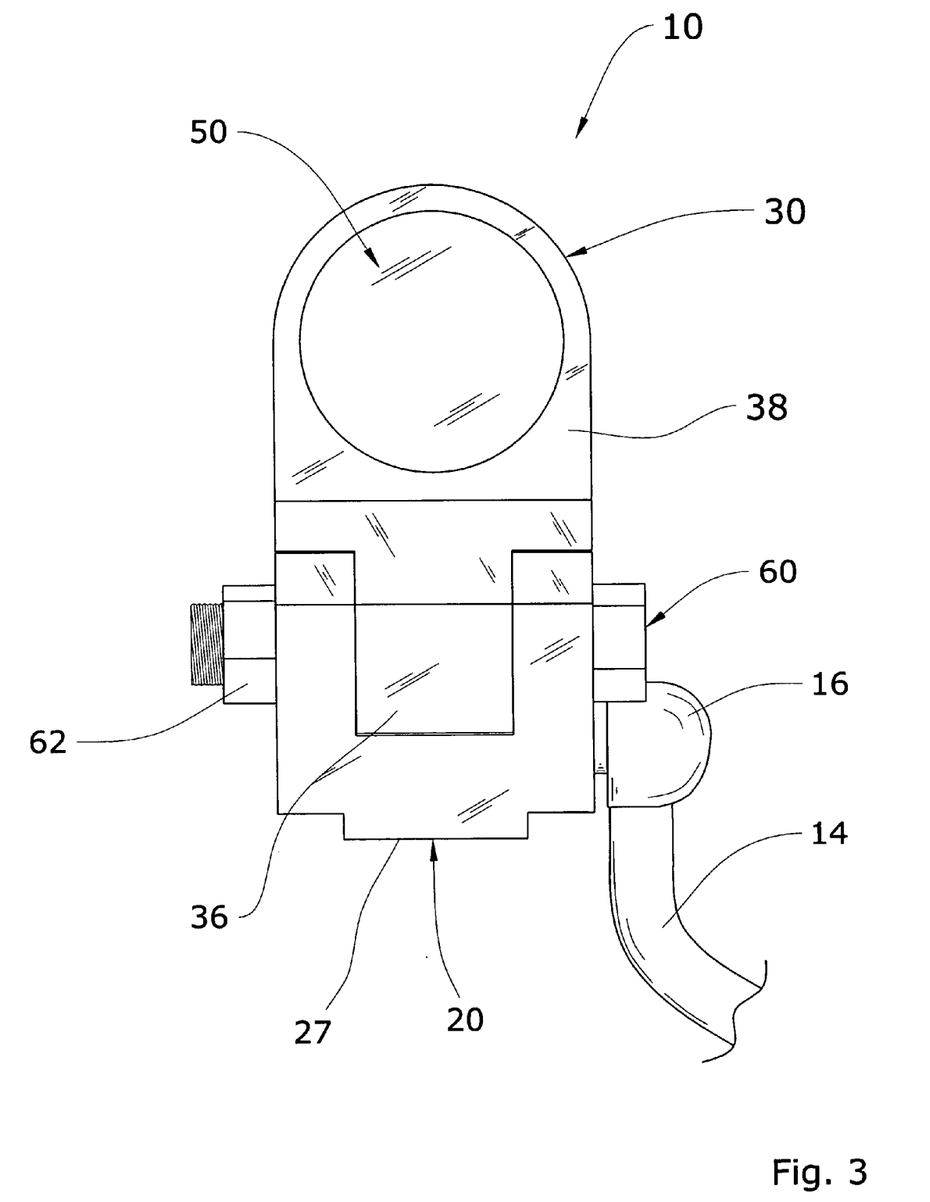
FIG. 3 is a front view of the present invention.

As most clearly shown in FIGS. 1 through 3, the pivot member 30 is preferably constructed with a curved or semi-circular upper surface attached to a main body extruded a distance substantially equal to the length of the first extension 24 and second extension 26. Attached at a lower portion of the pivot member 30 is a lower extension 36 which projects downwardly a distance substantially equal to the height of each extension 24, 26.

A first aperture 32 is preferably concentrically located with the semi-circular upper surface of the pivot member 30 and extends through the pivot member 30 from a front surface 38 to a rear surface 39 as shown in FIGS. 7a through 8b. It can be appreciated that the location of the first aperture 32 and height of the pivot member 30 can vary to accommodate different turning machines. The first aperture 32 is sized and machined, preferably threaded, to allow for the insertion and adjustment of an activation member 50. An alternative embodiment (not shown) would have an additional aperture extending into the first aperture 32 to allow a fastener or similar device to engage and lock-in the activation member 50 to prohibit any movement of the activation member 50.

As best shown in FIG. 2, a second pivot aperture 34 extends through the lower extension 36 substantially parallel to the front surface 38 and rear surface 39. The lower extension 36 is sized to fit between each inside surface of each extension 24, 26 on the base member 20. The second pivot aperture 34 is sized for the insertion of the shaft 60 used to allow for rotation of the pivot member 30. The second pivot aperture 34 is positioned such that when the pivot member 30 is assembled with the shaft 60, a lower surface 31 of the lower extension 36 on the pivot member 30 is raised a distance slightly above the upper surface 23 of the base member 20. This distance is best illustrated in FIGS. 7a and 8a.

D. Valve Unit

As shown in FIG. 2, 7a through 8b, the valve unit 40 is comprised of a valve body 41, a ball member 42, a spring 44, a pair of o-rings 46 and a valve fastener 48. As best illustrated in FIGS. 7a and 8a, the ball member 42, supported by the spring 44, protrudes slightly above an upper portion of the valve body 41 when the valve unit is in a closed state. In addition, the valve fastener 48 is inserted within the valve body 41 and applies an upward acting force on the spring 44 to retain the ball member 42 in the opening of the upper portion of the valve body 41.

As depicted in FIGS. 8a and 8b, the connector 16 extends into a side of the valve body 41. Compressed air from the air tank 12 fills the valve body 41 and is sealed within the valve unit 40 by the o-rings 46 located towards the upper and lower portions of the valve body 41. As shown in FIGS. 7b and 8b, as the pivot member 30 rotates, it presses downwardly on the ball member 42 and spring 44 to open the valve unit 40. In the open state, the compressed air retained within the valve unit 40 during the closed state is allowed to escape through the opening in the upper portion of the valve body 41.

E. Activation Member

The activation member 50 is preferably made of a rigid material that will not distort when machined or axial force is applied. The activation member 50 is preferably made of a material which will withstand contact with machining chemicals or solutions and exposure to moisture and humidity such that it will not rust or corrode. The activation member 50 may additionally be coated with a finishing material which must withstand contact with machining chemicals or solutions and exposure to moisture and humidity. The activation member 50 is preferably machined from a metal (e.g. 4140 steel) however, it can be appreciated that other steel compositions or metals (e.g. titanium) could be utilized.

As shown in FIGS. 1 through 6b, the activation member 50 is preferably a machined bolt like fastener, but it can be appreciated by one skilled in the art that many configurations, shapes and fastening methods could also be utilized. The activation member 50 preferably has an enlarged substantially circular head structure attached to a threaded portion. The outer perimeter of the head structure is also preferably knurled making it easier to grasp for loosening and tightening by a user. It can be appreciated that other configurations of the head structure (e.g. hex or socket) could be utilized to allow for easier use of tools by the user. The threaded portion of the activation member 50 should match that of an activation fastener 52 and the first aperture 32 located in the pivot member 30.

As shown in FIGS. 1 through 6b, the shaft 60 is preferably a machined bolt like fastener, but it can be appreciated by one skilled in the art that many configurations, shapes and fastening methods could also be utilized. The shaft 60 preferably has a hexagonal head structure attached to a rod and threaded portion. The head configuration of the shaft 60 is preferably hexagonal, making it easier to grasp with tools for loosening and tightening by a user. It can be appreciated that other configurations for the head structure (e.g. socket) could be utilized to allow for different tool use by the user. The threaded portion of the shaft 60 should match that of a pivot fastener 62 used to secure the shaft 60 within the base member 20 and pivot member 30.

F. Operation of the Invention

In use, the air release stock stop 10 is preferably utilized for indicating the proper feed of bar stock 18 during a turning machine operation. The air release stock stop 10 can be utilized on a turning machine having a single spindle 19 or multiple spindles 19. The air release stock stop 10 is preferably adjustable to allow for varying mounting configurations on different sized turning machines.

Figure 6A:
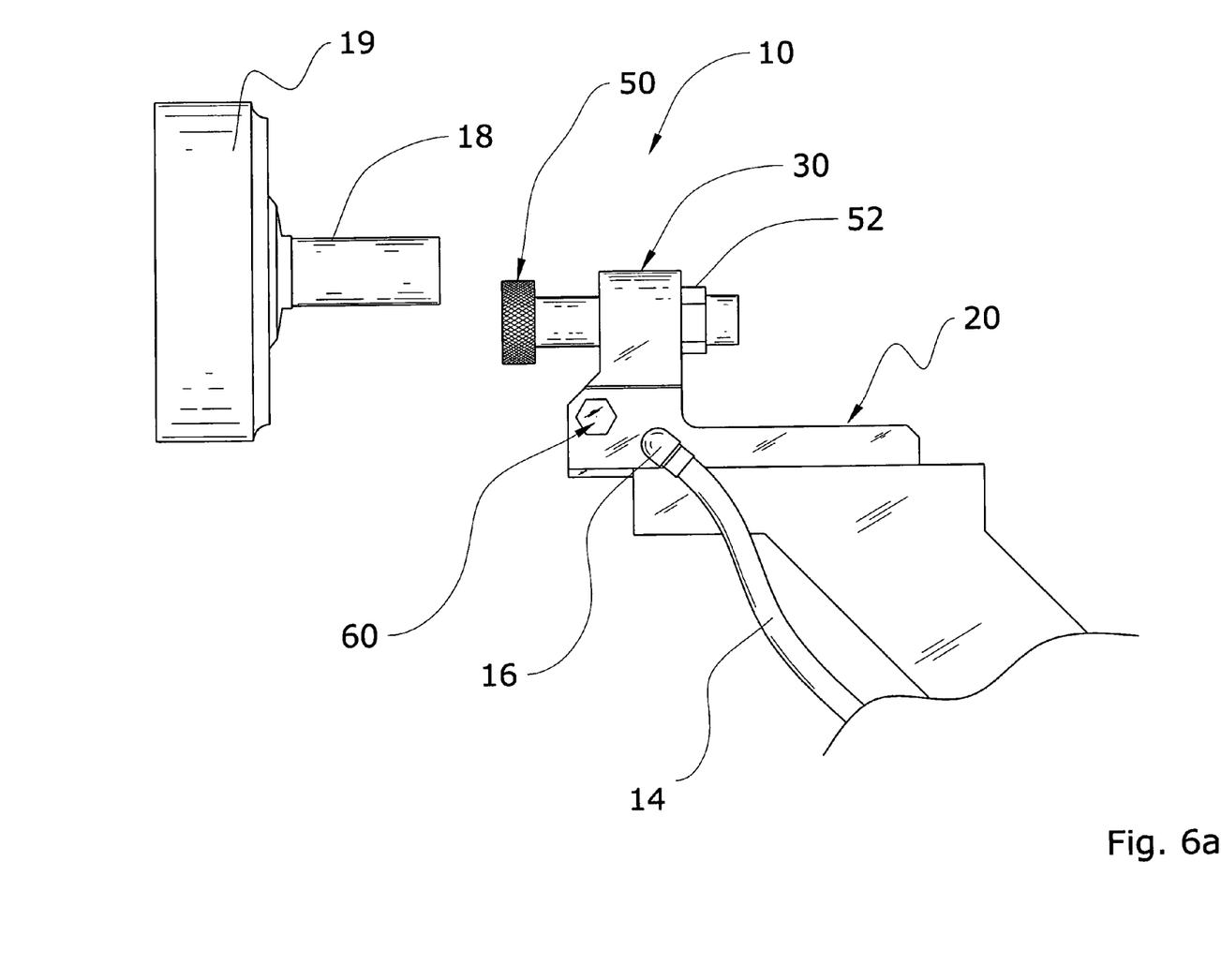
FIG. 6*a* is a side view of the present invention with spindle and bar stock approaching the contact member.
Figure 6B:
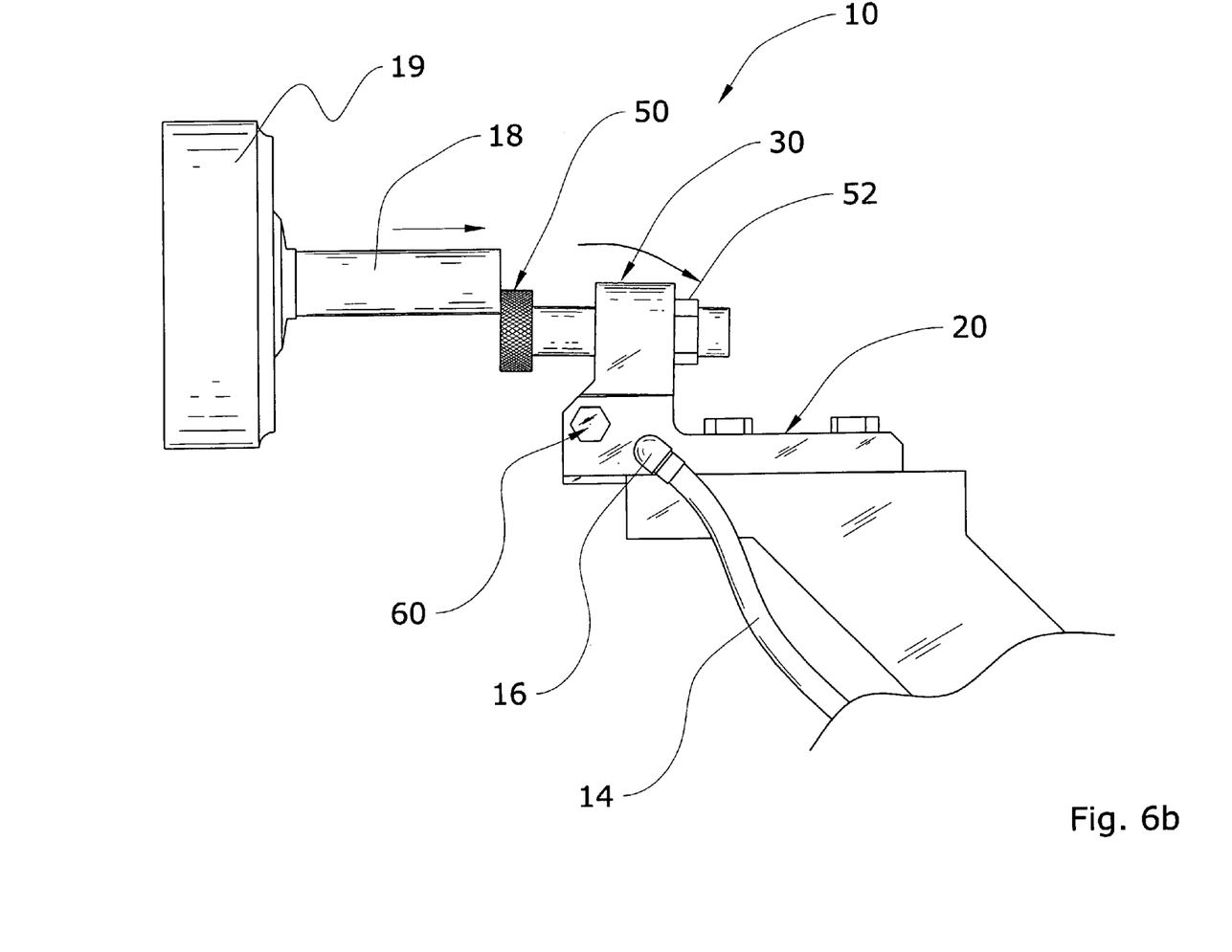
FIG. 6*b* is a side view of the present invention with the bar stock striking the contact member.

Initially for use, a capable mounting location for the air release stock stop 10 must be located on the turning machine. As best shown in FIGS. 6a and 6b, the preferred location will substantially align the activation member 50 with the bar stock 18 in the spindle 19 of the turning machine. The preferred location also allows for the entire lower surface 27 of the base member 20 to be mounted flush to a surface on the turning machine. If a location can not be found, a special bracket will be required to properly mount the air release stock stop 10 to the turning machine. The location or bracket will allow for two holes to be drilled matching the size and spacing of the mounting apertures 28 located in the base member 20 as shown in FIGS. 1 and 2. Fasteners are then used to mount the air release stock stop 10 to the selected location as shown in FIG. 6b.

With the activation member 50 and air release stock stop 10 properly aligned with bar stock 18, the fore and aft positioning of the activation member 50 can be adjusted to permit the desired amount of bar stock 18 to run-out past the spindle 19. As shown in FIGS. 6a and 6b, after the desired activation member 50 position is located, the activation fastener 52 is attached to the threaded end of the activation member 50 and tightened to the rear surface 39 of the pivot member 30 to lock the activation member 50 in place.

As shown in FIGS. 1 through 8a, the connector 16 and air line 14 are attached to the base member 20 through the inlet aperture 25. The air line is preferably attached to an air system and air tank 12 which sends pressured air to the valve unit 40 contained within the base member 20 of the air release stock stop 10. Preferably contained within the air system is a pressure switch that can detect pressure changes within the valve unit 25.

As machining progresses on the bar stock 18, as shown in FIGS. 6a and 6b, the bar stock 18 approaches the air release stock stop 10. When the bar stock 18 strikes the activation member 50 on the air release stock stop 10, it causes the pivot member 30 to rotate backwards as best illustrated in FIGS. 6b, 7b and 8b. As the pivot member 30 rotates backward, the lower surface 31 of the lower extension 36 contacts the ball member 42 in the valve unit 40, which is normally closed, causing the ball member 42 to move downward. With the ball member 42 moved downward and spring 44 compressed, an opening occurs at the upper portion of the valve body 41 permitting the once pressured air contained within the valve unit 40 to escape. The pressure drop caused by this operation is detected by the pressure switch in the air system indicating that the bar stock 18 has properly fed out.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A air release stock stop, comprising:
   a base member connected to an air supply;
   a pivot member pivotally connected to said base member by a shaft; and
   a valve unit attached within said base member, wherein said valve unit is activated by said pivot member, and wherein said valve unit is fluidly connected to said air supply.

2. The air release stock stop of claim 1, wherein said base member includes a first extension and a second extension, wherein a first pivot aperture extends substantially perpendicular through said first extension and said second extension.

3. The air release stock stop of claim 2, wherein said pivot member is positioned between said first extension and said second extension.

4. The air release stock stop of claim 1, wherein said pivot member includes a second pivot aperture extending through a lower extension of said pivot member.

5. The air release stock stop of claim 1, including a valve aperture extending through said base member, wherein said valve aperture is positioned between said first extension and said second extension.

6. The air release stock stop of claim 1, wherein said valve unit is comprised of:
   a valve body;
   a spring located within said valve body;
   a ball member located within said valve body, wherein said ball member is supported by said spring;
   a pair of o-rings attached about said valve body; and
   a valve fastener attached to said valve body, wherein said valve fastener compresses said spring within said valve body.

7. The air release stock stop of claim 6, wherein said valve unit is attached within said valve aperture in said base member, and wherein said valve unit is positioned with said ball member positioned substantially adjacent to a lower surface on said pivot member.

8. The air release stock stop of claim 1, includes a activation member adjustably attached within a first aperture extending through said pivot member.

9. A air release stock stop, comprising:
   a base member connected to an air supply;
   a pivot member pivotally connected to said base member by a shaft;
   a valve unit attached within said base member, wherein said valve unit is activated by said pivot member, and wherein said valve unit is fluidly connected to said air supply; and
   a activation member adjustably attached within a first aperture extending through said pivot member.

10. The air release stock stop of claim 9, wherein said base member includes a first extension and a second extension, wherein a first pivot aperture extends substantially perpendicular through said first extension and said second extension.

11. The air release stock stop of claim 10, wherein said pivot member is positioned between said first extension and said second extension.

12. The air release stock stop of claim 9, wherein said pivot member includes a second pivot aperture extending through a lower extension of said pivot member.

13. The air release stock stop of claim 9, including a valve aperture extending through said base member, wherein said valve aperture is positioned between said first extension and said second extension.

14. The air release stock stop of claim 9, wherein said valve unit is comprised of:
   a valve body;
   a spring located within said valve body;
   a ball member located within said valve body, wherein said ball member is supported by said spring;
   a pair of o-rings attached about said valve body; and
   a valve fastener attached to said valve body, wherein said valve fastener compresses said spring within said valve body.

15. The air release stock stop of claim 14, wherein said valve unit is attached within said valve aperture in said base member, and wherein said valve unit is positioned with said ball member positioned substantially adjacent to a lower surface on said pivot member.

16. A air release stock stop, comprising:
   a base member connected to an air supply, wherein said base member includes a first extension and a second extension, wherein a first pivot aperture extends substantially perpendicular through said first extension and said second extension, and wherein a valve aperture extends through said base member positioned between said first extension and said second extension;
   a pivot member pivotally connected to a shaft extending through said first pivot aperture a second pivot aperture extending through a lower extension of said pivot member;
   a activation member adjustably attached within a first aperture extending through said pivot member; and
   a valve unit attached within a said base member, wherein said valve unit is comprised of:
      a valve body;
      a spring located within said valve body;
      a ball member located within said valve body, wherein said ball member is supported by said spring;
      a pair of o-rings attached about said valve body; and
      a valve fastener attached to said valve body, wherein said valve fastener compresses said spring within said valve body;
   wherein said valve unit is fluidly connected to said air supply within said base member, wherein said ball member is positioned substantially adjacent to a lower surface on said pivot member, and wherein said valve unit is activated by said pivot member.

* * * * *